CONTROLLED BY LIQUID PRESSURE

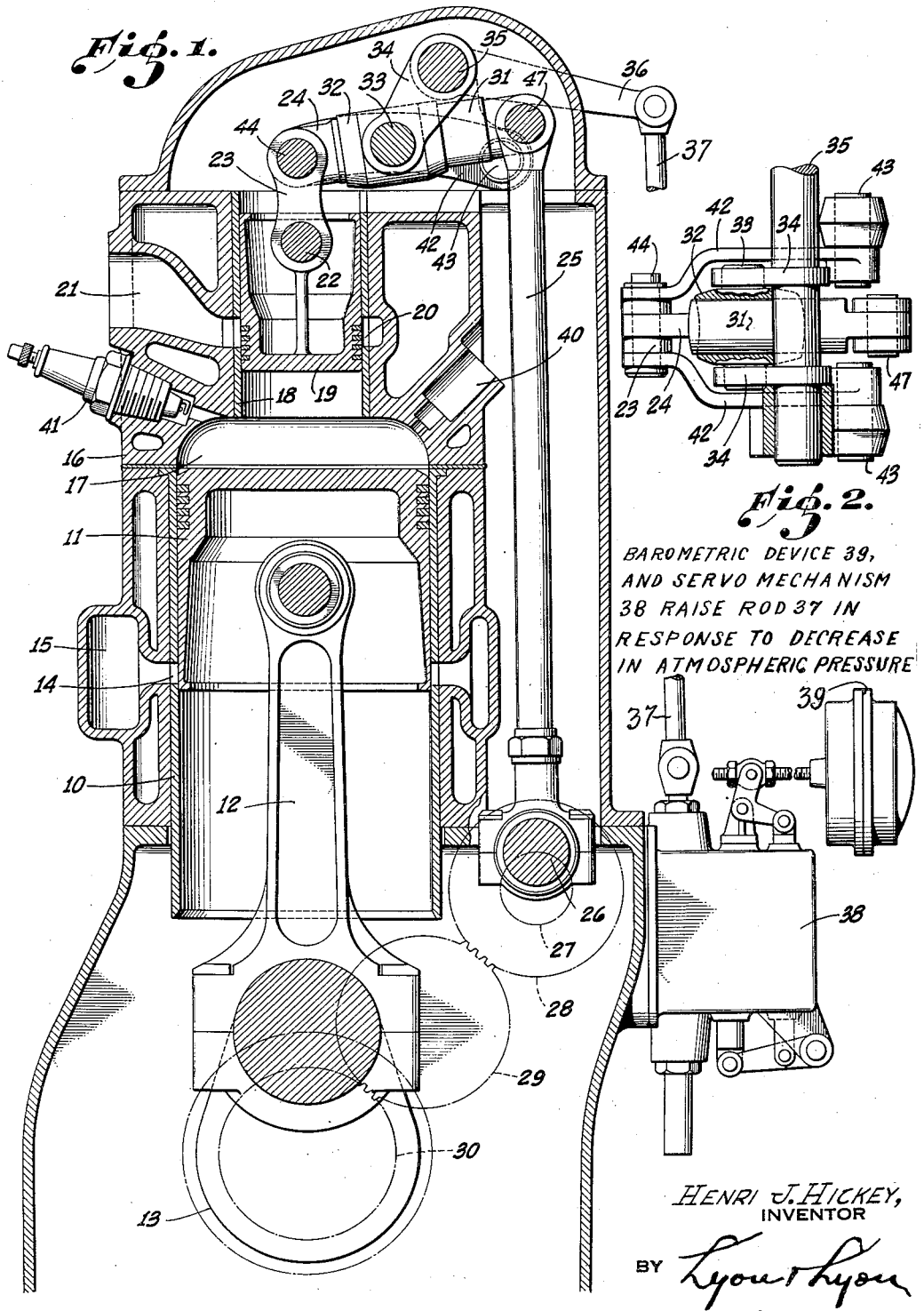

HENRI J. HICKEY, INVENTOR

Lyon & Lyon
ATTORNEYS.

Patented Apr. 20, 1943

2,316,790

UNITED STATES PATENT OFFICE 2,316,790

INTERNAL COMBUSTION ENGINE

Henri J. Hickey, Beverly Hills, Calif.

Application September 2, 1941, Serial No. 409,219

7 Claims. (Cl. 123—48)

This invention relates to internal combustion engines, and more particularly to engines employing piston valves as distinct from poppet valves.

A broad object of the invention is to provide a practicable method of varying the compression ratio of an internal combustion engine while it is in operation, whereby it may be adjusted to operate at high efficiency under varying conditions of operation.

It is well-known that when an internal combustion engine is operating at low duty, either because of a reduction in the throttle opening or because the atmospheric pressure is low, (a condition obtaining in airplanes at high elevations), the engine should be proportioned to have a very high compression ratio in order to deliver maximum power. In practice, however, the compression ratio is limited by knocking or detonation when operating at full duty, since an engine having a compression ratio high enough to operate at maximum efficiency at light duty, would knock badly when operated at full duty. Attempts have been made to solve this problem and provide an engine having high efficiency under both light and heavy duty, by providing an auxiliary piston that can be moved in or out to vary the size of the combustion chamber, the auxiliary piston remaining stationary during the operation of the engine except when adjustment is made to change the compression ratio. It has also been proposed to employ two opposed working pistons to vary the size of the combustion chamber between the two pistons by changing the relative timing of the pistons.

Both of these aforementioned methods of providing a variable compression ratio are subject to the criticism that they add additional complications to the engine. Whether or not these are the sole reasons, such engines have, to the best of my knowledge, never gone into commercial use.

In accordance with the present invention, I obtain a variable compression ratio by providing an auxiliary piston which reciprocates in synchronism with the working piston and functions to open and close valve ports of the engine, and provide a mechanism for varying the stroke of the auxiliary piston. Although this construction involves the use of an extra piston for each cylinder, this piston constitutes a valve element, thereby eliminating the usual valve structure. It also has an advantage over constructions in which the auxiliary piston remains stationary, except when it is shifted to vary the compression ratio. The advantage is that since the piston is constantly reciprocating, it is more readily lubricated, the continuous movement spreading the oil over the bearing surfaces. When a piston remains stationary, oil is forced out from between the bearing surfaces so that the piston tends to stick and wear rapidly.

For the purpose of explaining the invention, certain particular embodiments will now be described in detail with reference to the drawings, it being understood that various departures from the particular constructions shown can be made without departing from the invention.

In the drawings:

Fig. 1 is a longitudinal, vertical section through an engine incorporating the invention, showing the position of the pistons at the beginning of the working stroke, when the engine is adjusted for minimum compression ratio;

Fig. 2 is a plan view of the rocker arm mechanism in the engine of Fig. 1;

Figure 3:
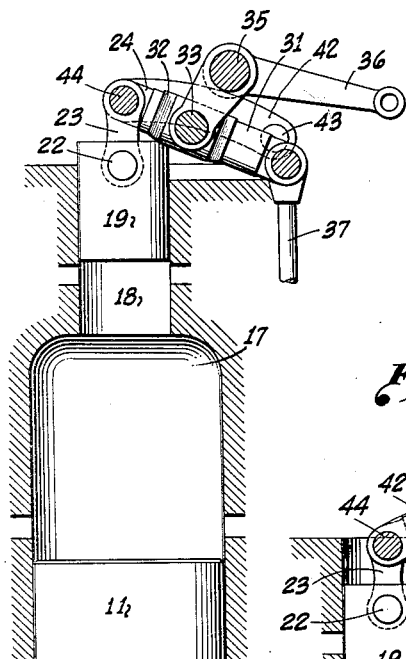
Fig. 3 is a schematic diagram showing the positions of the pistons at the end of the working stroke.

Referring to Fig. 1, the engine therein disclosed comprises a working cylinder 10 containing a working piston 11, which is connected by a connecting rod 12 to a crankshaft 13 in the usual manner. The engine is of the 2-cycle type, and the working cylinder 10 is provided with air inlet ports 14 adapted to be uncovered by the working piston 11 at the bottom of each stroke. The ports 14 communicate with a manifold 15, which may be supplied with air under pressure, in accordance with established practice.

The upper end of the working cylinder 10 is covered by a head 16 having a dome-shaped recess 17 which, in part, defines the combustion chamber of the engine. The head contains an auxiliary cylinder 18 which opens into the recess 17 at its lower end, and is blocked by a reciprocable valve piston 19, which covers and uncovers a plurality of exhaust ports 20, which communicate with an exhaust manifold 21.

The mechanism for reciprocating the valve piston 19 in synchronism with the working piston 11 includes a wrist pin 22 coupled by a pair of links 23 to a rocker arm 24, which rocker arm is pinned at its opposite end to the upper end of a push rod 25. The lower end of the push rod 25 engages a crankpin 26 on an auxiliary crankshaft 27 which is connected by gears 28, 29 and 30, respectively, to the main crankshaft 13. The gears 28 and 30 are of the same size, so that the auxiliary crankshaft turns at the same speed as the main crankshaft 13.

In accordance with the present invention, the compression ratio of the engine is varied by varying the stroke of the valve piston 19, and this is accomplished by providing a shiftable fulcrum for the rocker arm 24. Thus the latter has a cylindrical portion 31 on which is mounted a reciprocable sleeve 32 having trunnions 33 pivotally supported in arms 34 on a control shaft 35. Fig. 1 shows only one cylinder of an engine, which, in practice would usually be a multicylinder engine, under which condition the control shaft 35 would extend past a plurality of cylinders and control the valve mechanisms on all of them simultaneously.

The shaft 35 may be rocked by any suitable mechanism, but as shown in Fig. 1 there is secured to the shaft 35 an arm 36, the outer end of which is coupled by a link 37 to a servo-mechanism 38 controlled by a barometric device 39 so that the compression ratio of the engine is varied in response to changes in atmospheric pressure. Such a control is particularly useful in airplane engines. The details of the servo-mechanism 38 and the barometric device 39 do not constitute a part of the present invention, and such devices are well-known in the art. It therefore suffices to state herein that these devices 38 and 39 function to pull the push rod 37 down when the atmospheric pressure is high, and push it up in response to a reduction in atmospheric pressure. Fig. 1 shows the apparatus under high atmospheric pressure with the push rod 37 down.

Because of the fact that the rocker arm 24 is freely slidable within the sleeve 32, it is necessary to fix the path of movement of one end of the rocker arm, and this is done by providing a pair of arms 42 which are pivotally supported at one end on stationary pins 43 and have their other ends in pivotal engagement with the pin 44. The movement of the pin 44 is therefore confined to oscillation about the axis of pins 43.

The particular engine shown is of the injector type, having an opening 40 for a liquid fuel injector of any well-known type. A spark plug 41 is provided for ignition.

Fig. 1 shows the engine with the sleeve 32 positioned for minimum compression, and it will be observed that with the working piston at the beginning of the working stroke, the auxiliary piston 19 is at the bottom of its stroke, but is positioned a substantial distance above the lower end of the auxiliary cylinder 18 so that the combustion chamber is relatively large, to maintain the compression ratio below a value that would produce detonation when working at low elevations. Thus the trunnions 33 are positioned relatively close to the pin 44, so that the stroke of the piston 19 is substantially less than the stroke of the push rod 25. It will be observed, however, from an inspection of Fig. 3, that the stroke of the valve piston 19 is sufficient to uncover the exhaust ports 20 at the end of the working stroke.

Figure 4:
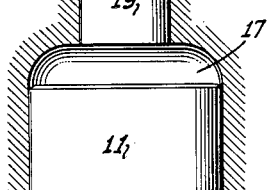
Fig. 4 is a schematic diagram showing the engine at the beginning of the working stroke, but adjusted for maximum compression.

Fig. 4 shows the arm 36 adjusted into extreme upper position, in which the sleeve 32 has been shifted to the right. Fig. 4 shows the position of the pistons at the beginning of the working stroke, and it will be observed that the auxiliary piston is at the lower end of the auxiliary cylinder 18, so that the combustion chamber is substantially smaller than under the condition of operation illustrated in Fig. 1.

Figure 5:
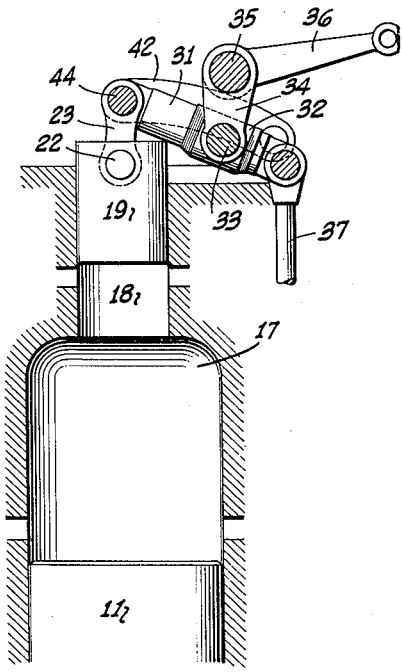
Fig. 5 is a schematic diagram showing the pistons at the end of the working stroke when adjusted for high compression ratio.

Fig. 5 shows the positions of the pistons at the end of the working stroke when adjusted for high compression operation. It is of interest to note that although the stroke of the auxiliary piston 19 is now substantially greater than under the conditions of operation illustrated in Figs. 1 and 3, the piston is in substantially the same position as in Fig. 3, which is desirable. This relatively constant upper limit position of the auxiliary piston results from the fact that the movement of the arms 34 carries the fulcrum axis of the rocker arm downward, as well as to the right, as is clearly observable from comparison of Figs. 3 and 5.

Figure 6:
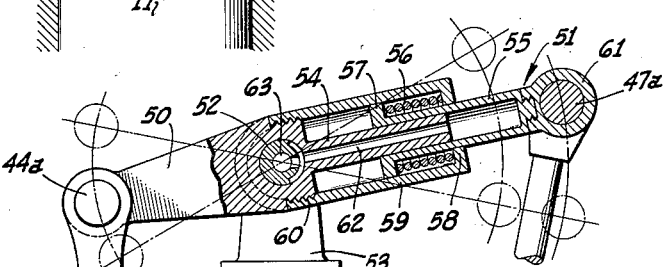
Fig. 6 is a vertical section through the upper part of a modified engine, showing a different mechanism for varying the stroke of the valve piston.
Figure 7:
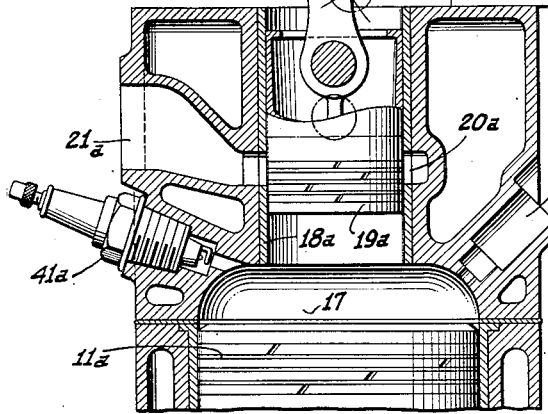
Fig. 7 is a detail section taken in the plane of the rocker arm axis.

There is disclosed in Figs. 6 and 7 a modified mechanism for varying the stroke of the auxiliary piston. All parts corresponding to those in Fig. 1 bear the same reference numerals with the suffix a. The difference between the structures is that whereas in Fig. 1 the rocker arm is of fixed length but its fulcrum point is shifted, in Figs. 6 and 7 the fulcrum point is fixed but the rocker arm is extensible. Thus the rocker arm comprises a piston member 50 and a cylinder member 51, which members are in telescoping relation so that they can separate and approach each other to vary the length of the rocker arm. The piston member 50 connects to the pin 44a and also to a fulcrum pin 52 which is fixedly mounted in a bifurcated stationary bracket 53. Formed on the right end of the member 50 is a piston 54, which is fitted in a cylinder 55 formed in the cylinder member 51. The cylinder and piston are normally retained in close coupled position, in which the piston substantially fills the cylinder, by a compression spring 56 surrounding the cylinder 55 and compressed between a flange 57 on the inner end of the cylinder and an inturned flange 58 on an annular housing 59 which is attached to the piston member 50 by screw threads 60 and includes a detachable eye 61, which engages the pin 47a.

In this embodiment of the invention, the stroke of the auxiliary piston 19a is at its maximum when the apparatus is in the condition shown in Fig. 6, in which distance between the fulcrum 52 and pin 47a is the minimum. The travel of the auxiliary piston 19a under these conditions is as shown in Figs. 4 and 5.

To reduce the stroke of the auxiliary piston, the right end of the rocker arm is elongated by separating the piston 54 and the cylinder 55. This separation is effected by forcing oil under pressure into the cylinder through a passage 62 in the piston, from a passage 63 in the stationary fulcrum pin 52, the passage 63 being communicated with a pipe 64 leading to an adjustable pressure oil supply, as shown in Fig. 7. The oil supply must be capable of supplying a sufficient volume of oil to maintain a desired pressure within the cylinder 55, irrespective of the slight, unavoidable leakage around the piston 54, and between the fulcrum pin 52 and the piston member 50.

By varying the pressure of the oil supply, the cylinder member 51 can be forced outward to a varied extent to increase the distance between the fulcrum pin 52 and the pin 47a, and thereby reduce the arc of movement of the pin 44a. Obviously, by varying the arc of movement of the pin 44a, the stroke of the auxiliary piston 19a is varied.

Since the fulcrum pin remains fixed in the embodiment of Figs. 6 and 7, the upper limit position of the auxiliary piston varies with variations in its stroke, and the piston may not uncover the exhaust ports 20a for as long a period when the engine is adjusted to operate at a low compression ratio, as when it is adjusted to operate at a high compression ratio. However, it is usually most important to have large valve openings when operating at low atmospheric pressure, so that this is not a serious defect.

Although for the purpose of explaining the invention two specific embodiments thereof have been described in great detail, it is to be understood that the invention is not limited to the exact constructions shown and described, but only to the extent set forth in the appended claims.

I claim:

1. In an internal combustion engine a working cylinder and a working piston reciprocable therein, an auxiliary cylinder communicating with said working cylinder, an auxiliary piston in said auxiliary cylinder, said cylinders and pistons defining a combustion chamber, means for reciprocating said auxiliary piston in synchronism with said working piston and for varying the stroke of said auxiliary piston to vary the compression ratio of the engine, said means including an extensible rocker arm, means fulcruming said rocker arm for rocking movement, means linking one end of said rocker arm to said auxiliary piston, means for reciprocating the other end of said rocker arm in response to reciprocation of said working piston, and means for varying the length of said rocker arm on one side of said fulcrum means, whereby the extent of rocking movement of said one end of the rocker arm is changed relative to the movement of the other end.

2. An engine as described in claim 1, in which said fulcrum means is fixed and said rocker arm is of fixed length between said fulcrum means and said one end, and said means for rocking the other end of said rocker arm includes a connecting rod pivotally supported at both ends for oscillatory and longitudinal movement.

3. An engine as described in claim 1, in which said extensible rocker arm comprises a pair of telescoping members defining a piston and cylinder, spring means urging said piston into said cylinder to shorten the rocker arm, and means for introducing fluid under pressure into said cylinder to overcome the force of said spring and lengthen one end of said rocker arm.

4. In an internal combustion engine, a working cylinder and a working piston reciprocable therein, an auxiliary cylinder communicating with said working cylinder, an auxiliary piston in said auxiliary cylinder, said cylinders and pistons defining a combustion chamber, means for reciprocating said auxiliary piston in synchronism with said working piston and in phase therewith, whereby both of said pistons reach the inner ends of their strokes substantially simultaneously at the beginning of the power stroke, and means for varying the stroke of said auxiliary piston to vary the compression ratio of the engine.

5. In an internal combustion engine, a working cylinder and a working piston reciprocable therein, an auxiliary cylinder communicating with said working cylinder, an auxiliary piston in said auxiliary cylinder, said cylinders and pistons defining a combustion chamber, means for reciprocating said auxiliary piston in synchronism with said working piston, said means comprising a rocker arm, and means coupling one end of said rocker arm to said auxiliary piston, whereby the latter is reciprocated in response to oscillation of said rocker arm, means for oscillating the other end of said rocker arm in response to reciprocation of said working piston, fulcrum means for rockably supporting said rocker arm, said fulcrum means being adjustable longitudinally along said rocker arm, and means for adjusting said fulcrum means relative to said rocker arm.

6. In an internal combustion engine, a working cylinder and a working piston reciprocable therein, an auxiliary cylinder communicating with said working cylinder, an auxiliary piston in said auxiliary cylinder, said cylinders and pistons defining a combustion chamber, means for reciprocating said auxiliary piston in synchronism with said working piston, said means comprising a rocker arm, and means coupling one end of said rocker arm to said auxiliary piston whereby the latter is reciprocated in response to rocking of said rocker arm, means for oscillating the other end of said rocker arm in response to reciprocation of said working piston, fulcrum means for rockably supporting said rocker arm, such fulcrum means being adjustable longitudinally along said rocker arm, means for adjusting said fulcrum means relative to said rocker arm, said rocker arm being freely slidable longitudinally with respect to said fulcrum means, means restricting said one end of said rocker arm for oscillation within a fixed path, and means for shifting said fulcrum means toward and away from said fixed path to thereby vary the position of said fulcrum means longitudinally of said rocker arm.

7. In an internal combustion engine, a working cylinder and a working piston reciprocable therein, an auxiliary cylinder communicating with said working cylinder, an auxiliary piston in said auxiliary cylinder, said cylinders and pistons defining a combustion chamber, means for reciprocating said auxiliary piston in synchronism with said working piston, said means including a rocker arm extendng in a direction approximately perpendicular to the axis of said auxiliary cylinder and having one end approximately in alignment with said auxiliary cylinder, means connecting said one end of said rocker arm to said auxiliary piston for reciprocating the latter, a fulcrum member slidable longitudinally on said rocker arm, means for moving said fulcrum member through a path having a lateral component away from the axis of said auxiliary cylinder and a longitudinal component parallel to said cylinder and toward the instroke end thereof, to simultaneously lengthen the stroke of said auxiliary piston and move it inwardly in its cylinder, and means for oscillating the other end of said rocker arm in response to reciprocation of said working piston.

HENRI J. HICKEY.